United States Patent
Tu

[19]

[11] Patent Number: 6,130,790
[45] Date of Patent: Oct. 10, 2000

[54] MIRROR ASSEMBLY

[76] Inventor: Bin Tu, 17019 Indian Grass Dr., Germantown, Md. 20874

[21] Appl. No.: 09/503,901

[22] Filed: Feb. 15, 2000

Related U.S. Application Data

[63] Continuation-in-part of application No. 09/232,719, Jan. 19, 1999, abandoned.

[51] Int. Cl.[7] .............................. G02B 5/08; G02B 7/182
[52] U.S. Cl. .......................... 359/841; 359/872; 359/881; 248/467; 248/480; 248/484
[58] Field of Search ..................................... 359/841, 871, 359/872, 881; 248/467, 479, 480, 481, 484, 486

[56] References Cited

U.S. PATENT DOCUMENTS

| | | | |
|---|---|---|---|
| 1,518,956 | 12/1924 | Beitman ................................. | 248/484 |
| 1,714,884 | 5/1929 | McConnell, Jr. . | |
| 2,133,839 | 10/1938 | Addor .................................... | 359/881 |
| 2,145,836 | 1/1939 | Parkins . | |
| 2,393,056 | 1/1946 | Noblitt et al. . | |
| 2,880,651 | 4/1959 | Fenyo .................................... | 248/467 |
| 2,915,944 | 12/1959 | Butts ..................................... | 248/467 |
| 3,051,055 | 8/1962 | West . | |
| 3,096,061 | 7/1963 | Bertell . | |
| 3,205,777 | 9/1965 | Brenner ................................. | 248/480 |
| 3,305,202 | 2/1967 | Christenson .......................... | 248/467 |
| 3,392,950 | 7/1968 | Pierce ................................... | 248/484 |
| 3,969,853 | 7/1976 | Deike . | |
| 4,530,646 | 7/1985 | McCoy . | |
| 4,823,471 | 4/1989 | Van Schaack . | |
| 4,856,888 | 8/1989 | Wahl . | |
| 4,925,287 | 5/1990 | Lord et al. . | |
| 5,039,045 | 8/1991 | Adams et al. . | |
| 5,229,888 | 7/1993 | Gustafsson et al. ................. | 248/467 |
| 5,816,547 | 10/1998 | Croft . | |
| 5,911,429 | 6/1999 | Shiau . | |

FOREIGN PATENT DOCUMENTS

| | | | |
|---|---|---|---|
| 807158 | 1/1937 | France .................................. | 248/467 |
| 299726 | 8/1965 | Netherlands .......................... | 359/881 |
| 158401 | 2/1921 | United Kingdom .................. | 248/467 |
| 790026 | 1/1958 | United Kingdom . | |
| 1138865 | 1/1969 | United Kingdom . | |
| 1199851 | 7/1970 | United Kingdom . | |

*Primary Examiner*—Ricky D. Shafer
*Attorney, Agent, or Firm*—Stephen R. Greiner

[57] ABSTRACT

A mirror assembly for releasable attachment to the windshield a land vehicle. The assembly includes a mount having a base plate and at least one suction cup. A telescoping arm extends from the base plate and joins a mirror thereto. The length of the arm may be set by means of a clamp which it carries. Swivel balls on the opposite ends of the arm permit the position of the mirror relative to the mount to be further adjusted.

1 Claim, 1 Drawing Sheet

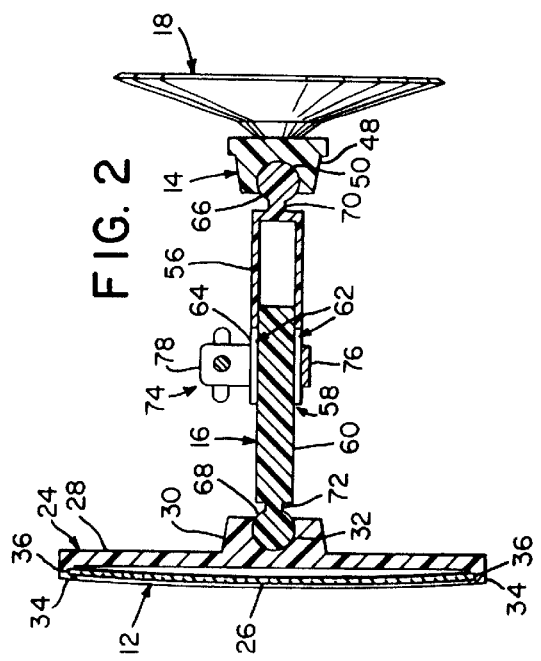

MIRROR ASSEMBLY

This application is a continuation-in-part of the application, Ser. No. 09/232,719, filed Jan. 19, 1999 now abandoned.

FIELD OF THE INVENTION

The present invention relates generally to supports for mirrors and, more particularly, to such supports utilizing suction cups.

BACKGROUND OF THE INVENTION

Rear-view mirrors have been mounted on the front windshield and side doors of automobiles for years to permit drivers to see trailing vehicles without turning their heads. It has long been known, however, that such mirrors present "blind spots" to drivers where trailing vehicles can move unobserved, often with tragic results. Attempts to improve rear-view mirrors by adding supplemental reflecting surfaces, for example, have not been altogether successful since the "improved" mirrors have retained immovable mounting features which restrict their fields of vision. A need, therefore, exists for a mirror assembly which may be selectively secured to the windshield of an automobile to expand an automobile driver's field of vision in a safe manner.

SUMMARY OF THE INVENTION

In light of the problems associated with conventional rearview mirrors with fixed mounts, it is a principal object of the invention to provide a mirror assembly which will supplement an automobile's factory-installed mirrors and expand the field of vision of the automobile's driver thereby eliminating blind spots.

It is another object of the invention to provide a mirror assembly of the type described which may be selectively attached by a driver of any stature to the windshield of an automobile in a location where reflected images may be observed without strain. Similarly, adjustments of the windshield-attached mirror assembly may also be easily made.

It is an object of the invention to provide improved elements and arrangements thereof in a mirror assembly for the purposes described which is lightweight in construction, inexpensive to manufacture, and dependable in use.

The mirror assembly in accordance with this invention achieves the intended objects by featuring a mount for releasable attachment to an automobile windshield or other support. The mount has a base plate carrying a pair of suction cups that are transparent for enhanced visibility through the windshield. A telescoping arm extends from the mount and includes a tube portion with a first swivel ball at one end and an opening at the other. The first swivel ball is movably positioned in a socket in the base plate. A rod portion slidably extends from the opening in the tube portion and has a second swivel ball at the free end thereof. A clamp movably located on the tube portion restricts the size of the opening and permits the positions of the tube and rod portions to be fixed relative to one another. A mirror, having a second socket for receiving the second swivel ball, is secured to the mount by the arm.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which:

FIG. 1 is a top view of a mirror assembly in accordance with the present invention.

FIG. 2 is a cross-sectional view of the mirror assembly taken along line 2—2 of FIG. 1.

FIG. 3 is a rear view of the mirror assembly.

FIG. 4 is a diagrammatic view showing the field of vision provided by a pair of mirror assemblies secured to the front windshield of an automobile.

Similar reference characters denote corresponding features consistently throughout the accompanying drawings.

DETAILED DESCRIPTION OF THE PREFERRED EMBODIMENT

Referring now to the FIGS., a mirror assembly in accordance with the present invention is shown at 10. The assembly 10 includes a mirror 12 joined to a mount 14 by means of a telescoping arm 16. A pair of suction cups 18, forming part of the mount 14, may be used to releasably secure the assembly 10 to a smooth surface such as the front windshield 20 of an automobile 22.

The mirror 12 has a protective housing 24 which encloses, on five sides, a reflective element 26. The housing 24 includes a rectangular, backing plate 28 having a boss 30, with a spherical socket 32, extending forwardly therefrom and, also, having a peripheral rim 34 extending rearwardly therefrom. Rim 34 is provided with an interior groove 36 adjacent backing plate 28 for receiving the top, bottom and sides of reflective element 26.

The reflective element 26 preferably comprises a glass plate coated on one side with silver or a like material. To increase the field of vision offered thereby, the glass plate is provided with a convex form so that it bulges, at its center, slightly away from the backing plate 28.

The mount 14 includes a base plate 38 having axially-aligned, keyhole slots 40 in its opposite ends for snugly receiving the tapered, neck portions 42 of suction cups 18. Slots 40 include relatively narrow, channel portions 44 that extend into the base plate 38 and relatively wide and circular, terminal portions 46 at the inner end of channel portion 44. Between the slots 40, a boss 48, with a spherical socket 50, extends forwardly from base plate 38.

Suction cups 18 are formed of a transparent, resilient and rubber-like material so that vision through windshield 20 is not greatly obscured during use of assembly 10. When pressed against windshield 20, a partial vacuum is formed in cup portions 52 thereby adhering assembly 10 to the windshield. Each of the cups 18 includes a cup portion 52 and a button portion 54 connected by a neck portion 42. Each neck portion 42 is adapted for snug positioning within a terminal portion 46 of a slot 40.

Terminal portions 46 serve as a stop features or abutments for neck portions 42 and allow suction cups 18 to be driven directly toward one another for easy construction of assembly 10. The configuration of terminal portions 46 further insures that suction cups 18 will not become easily disengaged from base plate 38 since forces which would tend to drive one suction cup 18 from a slot 40 are opposed by the other suction cup 18. Should one of the suction cups 18 somehow become disengaged from base plate 38 or windshield 22, however, the remaining suction cup 18 serves as a backup so as to retain assembly 10 in place.

The telescoping arm 16 includes a tube portion 56 having an opening 58 at one end from which a rod portion 60 may be selectively extended. A pair of longitudinal notches 62 extend into the tube portion 56 from the opening 58 defining opposed, C-shaped, clamping members 64. Swivel balls 66 and 68 are respectively secured by narrowed stems 70 and 72 to the ends of the tube portion 56 and rod portion 60 remote from the opening 58. Balls 66 and 68 are positioned within sockets 50 and 32 so that arm 16 may provide an adjustable link between mirror 12 and mount 14.

A clamp 74 on the tube portion 56 adjacent the opening 58 permits the length of the arm 16 to be adjusted. The clamp 74 has an open ring 76 with a pair of tabs 78 and 80 extending from its ends in parallel fashion. The tabs 78 and 80 are provided with aligned apertures 82 and 84 for receiving the threaded portion 86 of a thumb screw 88. The aperture 82 is threaded for engagement with portion 86 so that, when the handle portion 90 of the thumb screw 88 is tightened, the tabs 78 and 80 and clamping members 64 are drawn together, thereby fixing the positions of the tube and rod portions 56 and 60 relative to one another. When thumb screw 88 is not tightened, the clamp 74 is free to both pivot and slide on tube portion 56 so that a user can adjust its position, during use on windshield 20, for easy access.

In use, a pair of assemblies 10 are preferably secured to the front windshield 20 of automobile 22. As shown in FIG. 4, one assembly 10 is located adjacent the left side of the automobile 22 so as to provide field of vision A. The other assembly 10 is located slightly to the left of the factory-installed mirror 92 on the center line of the automobile 22 so as to provide field of vision B. The overlapping fields of vision A and B provide a driver of the automobile 22 with a complete view of the scene rearward of the assemblies 10 thereby eliminating blind spots. The automobile 22 can be maneuvered safely through traffic.

While the invention has been described with a high degree of particularity, it will be appreciated by those skilled in the art that modifications may be made thereto. For example, the number of suction cups 18 used to retain the assembly 10 as well as the locations of the bosses 30 and 48 on the mirror 12 and mount 14 can be varied as desired. Further, the notches 62 could be deleted provided the tube portion 56 were formed from a sufficiently resilient material. Therefore, it is to be understood that the present invention is not limited to the sole embodiment described above, but encompasses any and all embodiments within the scope of the following claims.

I claim:

1. A mirror assembly, comprising:
   a mount for releasably securing said mirror assembly to a supporting surface, said mount including:
      a base plate having first opposed ends and a pair of keyhole slots each being respectively located in one of said first opposed ends and being axially aligned with one another, each of said keyhole slots having a channel portion extending into one of said first opposed ends and terminating at an inner end, and each of said keyhole slots also having a relatively wide and circular terminal portion at the inner end of said channel portion;
      said base plate also having a first boss with a first socket therein; and,
      a pair of suction cups formed of a transparent material attached to said base plate, each of said suction cups having a cup portion connected by a tapered, neck portion to a button portion, each said neck portion being respectively positioned within one said terminal portion with each said terminal portion serving as a stop to prevent further movement of each said neck portion into said base plate;
   a telescoping arm extending from said mount, said telescoping arm including:
      a tube portion having opposed ends and a first swivel ball at one of said opposed ends movably positioned in said first socket, said tube portion further having an opening at the other of said opposed ends and a pair of longitudinal notches extending into said tube portion from said opening thereby providing said tube portion with a pair of C-shaped, clamping members;
      a rod portion slidably positioned between said clamping members and having a free end extending from said opening, said rod portion having a second swivel ball at said free end thereof; and,
      a clamp slidably and pivotally positioned on said tube portion for driving said clamping members against said rod portion and selectively fixing the positions of said tube portion and said rod portion relative to one another, said clamp including:
         an open ring encircling said clamping members;
         a pair of tabs integrally formed with said ring and extending outwardly therefrom in a parallel relationship, said tabs being provided with first and second axially aligned apertures, the first axially aligned aperture being internally threaded; and,
         a thumb screw having a threaded portion extending through said apertures and being threadably engaged with said first axially aligned aperture; and,
   a mirror having a convex, reflective element, said reflective element being supported by a protective housing, said housing having a second boss with a second socket within which said second swivel ball is movably positioned.

* * * * *